(12) United States Patent
Han et al.

(10) Patent No.: US 6,597,929 B1
(45) Date of Patent: Jul. 22, 2003

(54) METHOD FOR REDUCING POWER CONSUMPTION OF A RADIO TERMINAL BY SENSING DURATION OF NONSERVICE AND/OR VARYING RECEIVE PERIOD

(75) Inventors: Jae-Hee Han, Seoul (KR); Kil-Young Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/438,802

(22) Filed: Nov. 12, 1999

(30) Foreign Application Priority Data

Nov. 13, 1998 (KR) ............................................. 98-48579
Dec. 30, 1998 (KR) ............................................. 98-60785

(51) Int. Cl.$^7$ ................................................ H04B 1/38
(52) U.S. Cl. ...................................... 455/574; 370/311
(58) Field of Search ............................... 455/574, 421, 455/515, 343; 370/311

(56) References Cited

U.S. PATENT DOCUMENTS

| 4,903,319 | A | * | 2/1990 | Kasai et al. ................. 455/127 |
| 5,152,006 | A | * | 9/1992 | Klaus ......................... 340/7.33 |
| 5,301,225 | A | * | 4/1994 | Suzuki et al. ............... 455/343 |
| 5,519,762 | A | * | 5/1996 | Bartlett ....................... 340/7.38 |
| 5,590,396 | A |   | 12/1996 | Henry ......................... 455/33.1 |
| 5,627,882 | A | * | 5/1997 | Chien et al. ................. 340/7.33 |

* cited by examiner

Primary Examiner—Edward F. Urban
Assistant Examiner—Nick Corsaro
(74) Attorney, Agent, or Firm—Dilworth & Barrese, LLP (57) ABSTRACT

A method for reducing the power consumption of a radio terminal. The method includes the steps of: setting a receiving period to a minimum period value if power supplied to the radio terminal is turned on; receiving data and determining whether a bit error occurs; determining whether the receiving period is less than or equal to the minimum period value if the bit error occurs; decreasing the receiving period if the receiving period is greater than the minimum period value; determining whether the receiving period is greater than or equal to a maximum period value if no bit error is detected; increasing the receiving period if the receiving period is less than the maximum period value; turning off power supplied to at least one component of the terminal during the set receiving period if the receiving period is less than or equal to the minimum period value or if it is greater than or equal to the maximum period value; and turning on the power supplied to the at least one component of the terminal if the receiving period has elapsed and returning to the step of receiving data.

6 Claims, 7 Drawing Sheets

METHOD FOR REDUCING POWER CONSUMPTION OF A RADIO TERMINAL BY SENSING DURATION OF NONSERVICE AND/OR VARYING RECEIVE PERIOD

PRIORITY

This application claims priority to an application entitled "Method for Reducing Power Consumption of Radio Terminal" filed in the Korean Industrial Property Office on Nov. 13, 1998 and assigned Serial No. 98-48579, the contents of which are hereby incorporated by reference.

BACKGROUND OF THE INVENTION

1. Field of the Invention

The present invention relates to a method for controlling power consumption in a radio terminal, and more particularly, to a method for minimizing power consumption in a non-service area by altering a receiving period of a paging message.

2. Description of the Related Art

There are two ways to lengthen the lifetime of a battery in a radio terminal. First, increase the capacity of the battery, and second, reduce the rate of power consumption in the mobile phone. Since increasing the capacity of the battery usually entails increasing the weight of the phone, the latter alternative is more attractive.

U.S. Pat. No. 5,590,396 discloses a method for saving battery power by turning off power supplied to a specific part of the mobile phone for a predetermined period of time if a user enters a page only mode. Unfortunately, this method requires the user to change the mode into a paging only mode manually. While the base station is informed of the start time and end time of a page only mode, the radio terminal can only get a paging message generated during the page only period. There is an additional drawback associated with this method. Namely, this operation is available only within a service area.

Once a radio terminal enters a non-service area, it continues to check an RSSI (Received Signal Strength Indicator) measurer to see if it is possible to provide services. Thus, if the radio terminal enters an extensive non-service area or stays in a non-service area for a long time, power is consumed to determine whether services are available. Furthermore, since the radio terminal enters an idle state, power is unnecessarily dissipated. When the user finally enters a service area and tries to use the radio terminal, the battery may have already been discharged and the phone rendered inoperable.

In a conventional radio communication system, a base station continuously transmits a paging message to a radio terminal for a predetermined period of time so that the terminal can receive the message even if it temporarily enters a non-service area or if it instantaneously misses data. Unfortunately, the radio terminal continues to check whether there is a paging message. Although the terminal can adaptively receive the paging message, it continuously checks whether there is a paging message irrespective of an RSSI level or an error in data. This consumes power unnecessarily.

SUMMARY OF THE INVENTION

It is, therefore, an object of the present invention to provide a method for minimizing the power consumption of a radio terminal in a non-service area.

It is another object of the present invention to provide a method for automatically reducing power consumption in a non-service area.

It is still another object of the present invention to provide a method for reducing the power consumption of a mobile terminal.

To achieve these and other objects of the present invention, there is provided a method for reducing the power consumption of a radio terminal having the steps of: First, setting a receiving period to a minimum period value if power supplied to the radio terminal is turned on; Second, receiving data and determining whether a bit error occurs; Third, determining whether the receiving period is less than or equal to the minimum period value if the bit error occurs; Fourth, decreasing the receiving period if the receiving period is greater than the minimum period value; Fifth, determining whether the receiving period is greater than or equal to a maximum period value if no bit error is detected; Sixth, increasing the receiving period if the receiving period is less than the maximum period value; Seventh, turning off power supplied to at least one component of the terminal during the set receiving period if the receiving period is less than or equal to the minimum period value or if it is greater than or equal to the maximum period value; and Eighth, turning on the power supplied to the at least one component of the terminal if the receiving period has elapsed; and Finally, returning to the step of receiving data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well-known constructions or functions are not described in detail so as not to obscure the present invention.

Figure 1:
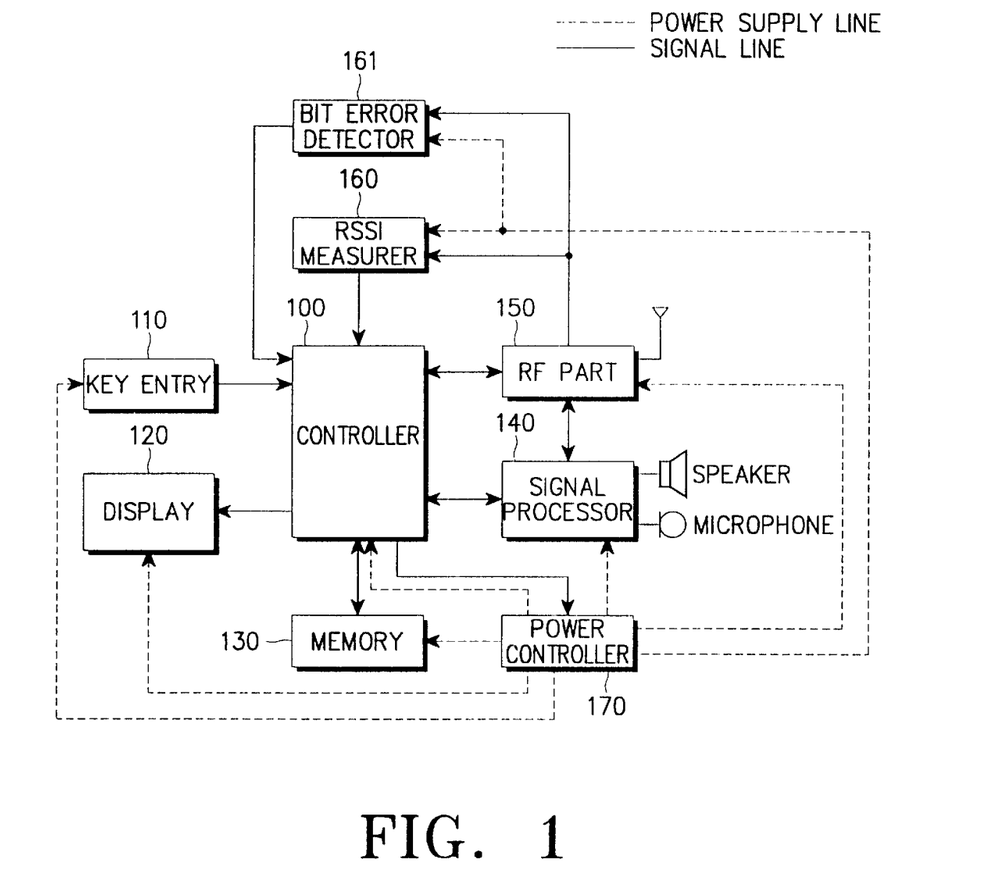
FIG. 1 is a schematic block diagram of a general radio terminal.

Referring to FIG. 1, there is shown a schematic block diagram of a general radio terminal. A controller 100 controls the overall operation of the radio terminal. A memory 130 includes a ROM (Read Only Memory) for storing operational programs, an EEPROM (Electrically Erasable and Programmable Read Only Memory), and a RAM (Random Access Memory). A display 120, an LCD (Liquid Crystal Display) for example, displays the state of the radio terminal or a processing state of a program as instructed by the controller 100. A key entry 110 is comprised of a plurality of numeric keys and function keys and provides key data generated by external key input to the controller 100. An RF (Radio Frequency) part 150 transmits data to a base station via an antenna and receives an RF signal via the antenna, as instructed by the controller 100. A signal processor 140 modulates a voice signal input via a microphone into voice data and demodulates voice data received from the RF part 150 into a voice signal. The demodulated voice signal is output through a speaker. An RSSI measurer 160 measures an RSSI level of a signal received from the base station via RF part 150. For example, the RSSI measurer 160 may measure an RSSI level of a signal received over a pilot channel in a CDMA (Code Division Multiple Access) terminal. By measuring the RSSI level, it is determined whether the terminal is in a non-service area. A bit error detector 161 checks whether data received via the antenna has a bit error and informs the controller 100 of the checked result. A power controller 170 controls power supplied to each part as instructed by the controller 100.

Figure 2:
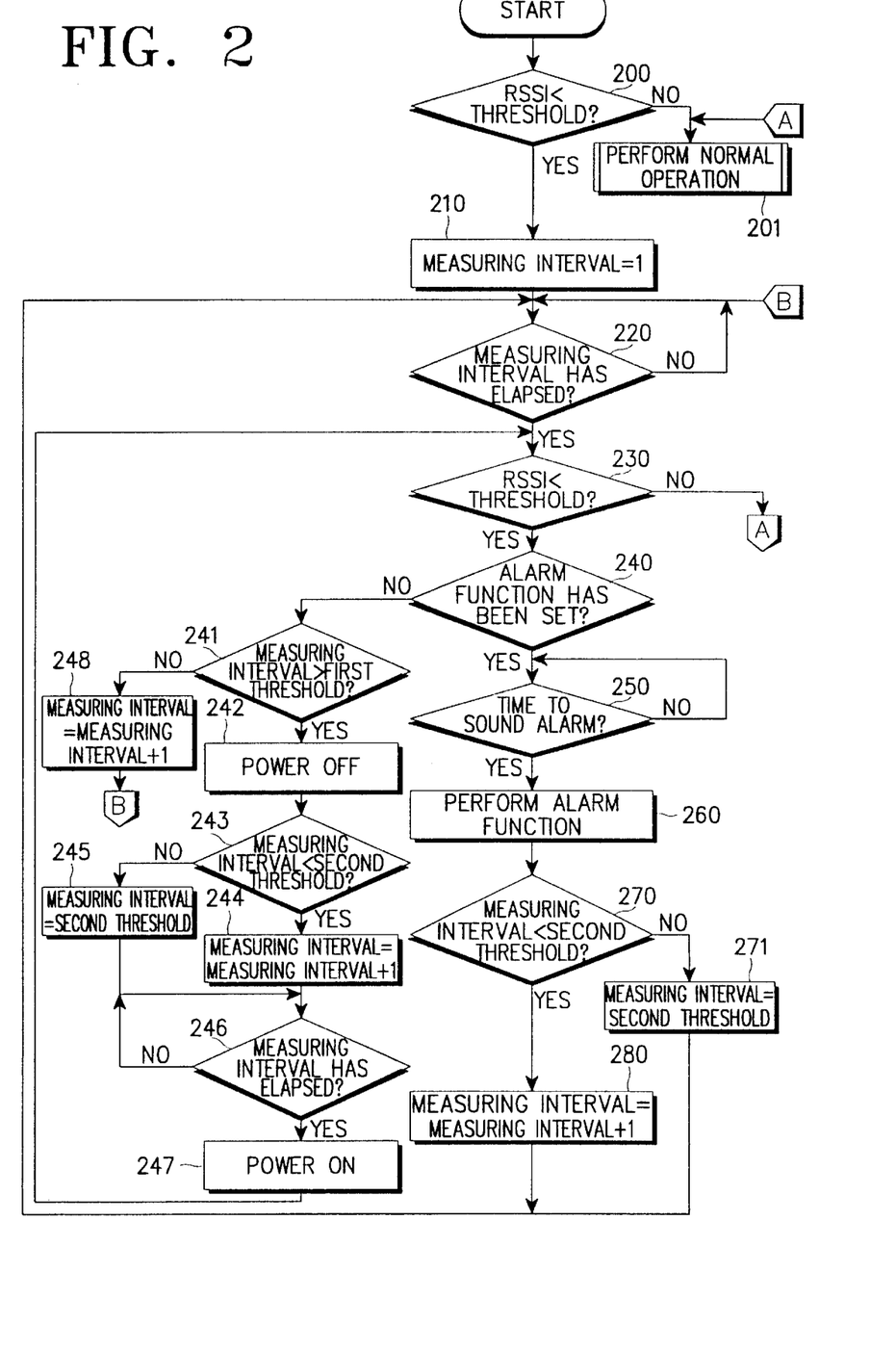
FIG. 2 is a flowchart illustrating the process of controlling the power of a radio terminal in a non-service area according to a first embodiment of the present invention.

Referring to FIG. 2, there is shown a first embodiment of the process of controlling the power of a radio terminal in a non-service area according to the present invention. Controller 100 determines if the radio terminal is in a non-service area by determining if the RSSI, measured by the RSSI measurer 160, is less than a predetermined value at step 200. If not, the process proceeds to step 201 to perform a normal operation. If the RSSI is less than a predetermined value, the process proceeds to step 210 where the controller 100 sets an RSSI measuring time interval to one second and directs the memory 130 to store the set time interval in a specific area. The controller 100 then determines if the measuring time interval has elapsed at step 220. If not, the controller 100 continues to determine if the measuring time interval has elapsed. If it has elapsed, the controller 100 directs the RSSI measurer 160 to measure the RSSI to see if it is less than a predetermined value at step 230. If not, the process returns to step 201. If it is less than a predetermined value, the controller 100 determines if an alarm function has been set at step 240. If it has been set, the controller 100 determines if it's time to sound an alarm at step 250. If so, the alarm function is performed at step 260. The controller 100 then determines if the measuring time interval is less than a second threshold at step 270. The second threshold is given to prevent the measuring time interval from exceeding the second threshold. If the measuring time interval is less than the second threshold, it is increased by one second and the increased measuring time interval is stored in the memory 130, at step 280. In this case, one second is not a fixed value and may be modified. If the measuring time interval is not less than the second threshold, it is set to the second threshold at step 271. After setting the measuring time interval at step 280 or 271, the process returns back to step 220 to see if the measuring time interval has elapsed.

Meanwhile, if the alarm function has not been set at step 240, the controller 100 determines if the measuring time interval is greater than a first threshold at step 241. The first threshold is used to reduce power consumption by turning off power supplied to unnecessary parts when the measuring time interval is greater than a predetermined period of time. If the measuring time interval is greater than the first threshold, the controller 100 directs, at step 242, the power controller 170 to turn off power supplied to, for instance, the RSSI measurer 160, display 120, signal processor 140 and RF part 150. Power is provide to a timer (not shown) and the controller 100. In a power-off state, a user may press a power key, and the power is turned on and a normal operation is performed. The controller 100 determines if the measuring time interval is less than the second threshold at step 243. If so, the measuring time interval is increased by one second and the increased measuring time interval is stored in the memory 130, at step 244. If the measuring time interval is not less than the second threshold, it is set to the second threshold at step 245. After setting the measuring time interval at step 244 or 245, the controller 100 determines if the measuring time interval has elapsed at step 246. If it has elapsed, the controller 100 directs the power controller 170 to turn on the power at step 247. The process then returns to step 230. If the measuring interval time is not greater than the first threshold at step 241 it is increased by one second and the increased measuring time interval is stored in the memory 130, at step 248. The process then returns to step 220.

In brief, the RSSI is first measured, and if it is judged that the terminal is in a non-service area, the RSSI is measured at increasing time intervals. If the measuring time interval is greater than the first threshold, the power is turned off. If, however, the alarm function has been set, the alarm function is performed. The measuring time interval is increased until it reaches the second threshold. The power is turned off during the measuring time interval. If the measuring time interval has elapsed, the power is turned on and the RSSI is measured again.

Figure 3:
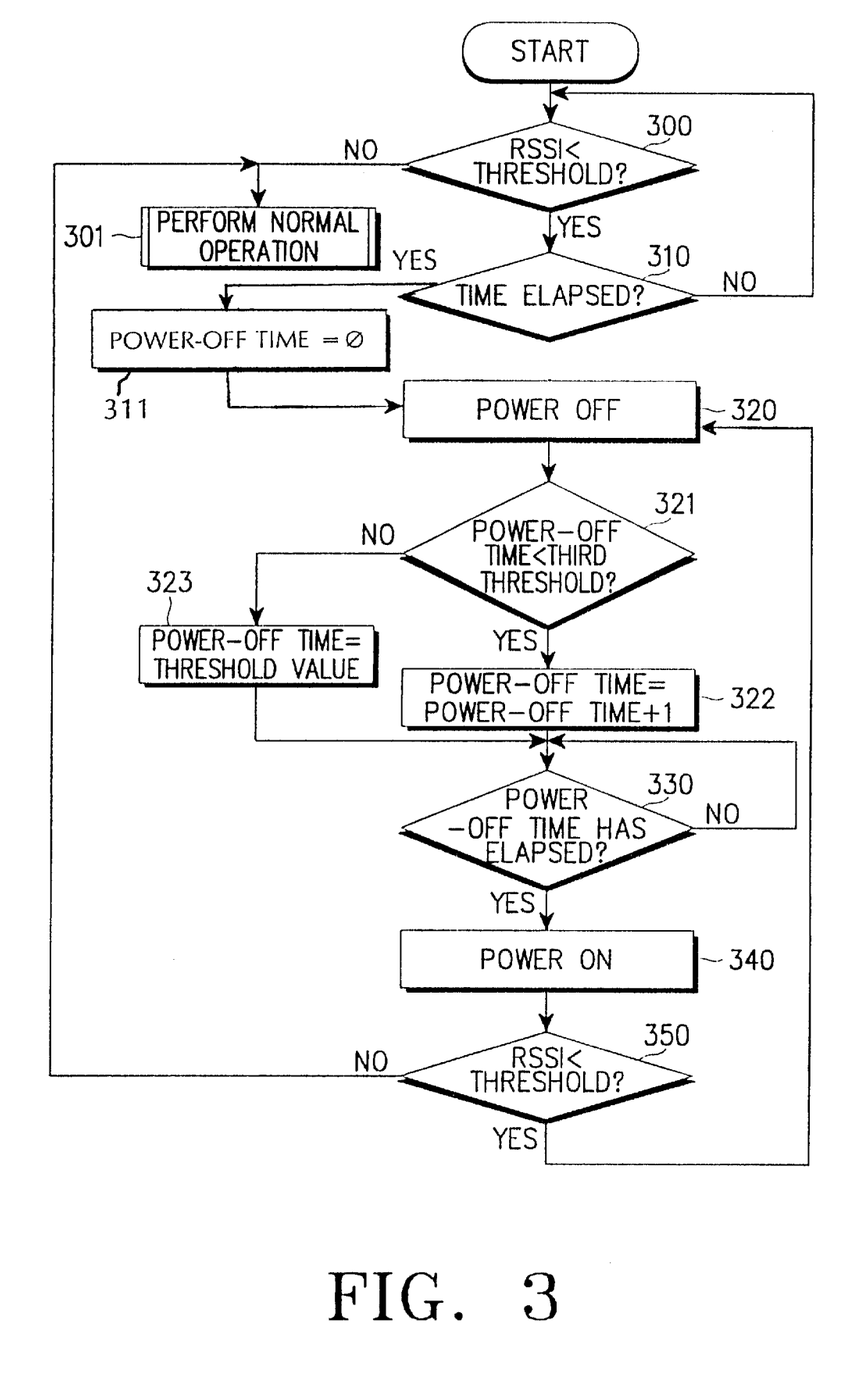
FIG. 3 is a flowchart illustrating the process of controlling the power of a radio terminal in a non-service area according to a second embodiment of the present invention.

Referring to FIG. 3, there is shown a second embodiment of the process of controlling the power of a radio terminal in a non-service area according to the present invention. Controller 100 directs the RSSI measurer 160 to measure the RSSI to see if it is less than a predetermined value at step 300. If not, a normal operation is performed at step 301. If the RSSI is less than a predetermined value, the controller 100 determines if a predetermined time period has elapsed at step 310. If a predetermined time period has not elapsed, to process proceed to step 300 and compares the RSSI with the threshold value. If a predetermined time period has elapsed in a non-service area, the controller 100 directs the power controller 170 to turn off power supplied to unnecessary parts of the mobile phone at step 320. For example, power supplied to the RSSI measurer 160 may be turned off to reduce power consumption. The controller 100 then determines if a power-off time is less than a third threshold at step 321. If so, the power-off time is increased by one second at step 322. If the power-off time is not less than the third threshold, the power-off time is set to the third threshold at step 323. The controller 100 then determines if the power-off time has elapsed at step 330. If so, the power is turned on at step 340. The controller 100 then determines if the RSSI is less than a predetermined value at step 350. If it is less than a predetermined value, the process returns to step 320, and if not, the process returns to step 301.

In brief, if the terminal is in a non-service area, the power is turned off for a power-off time to reduce power consumption. If the power-off time has elapsed, the power is turned on and the RSSI is measured again. If the RSSI is greater than a predetermined value, that is, if the terminal is in a service area, normal operation is performed. If the RSSI is less than the predetermined value, the power-off time is lengthened until it reaches the third threshold.

Figure 4:
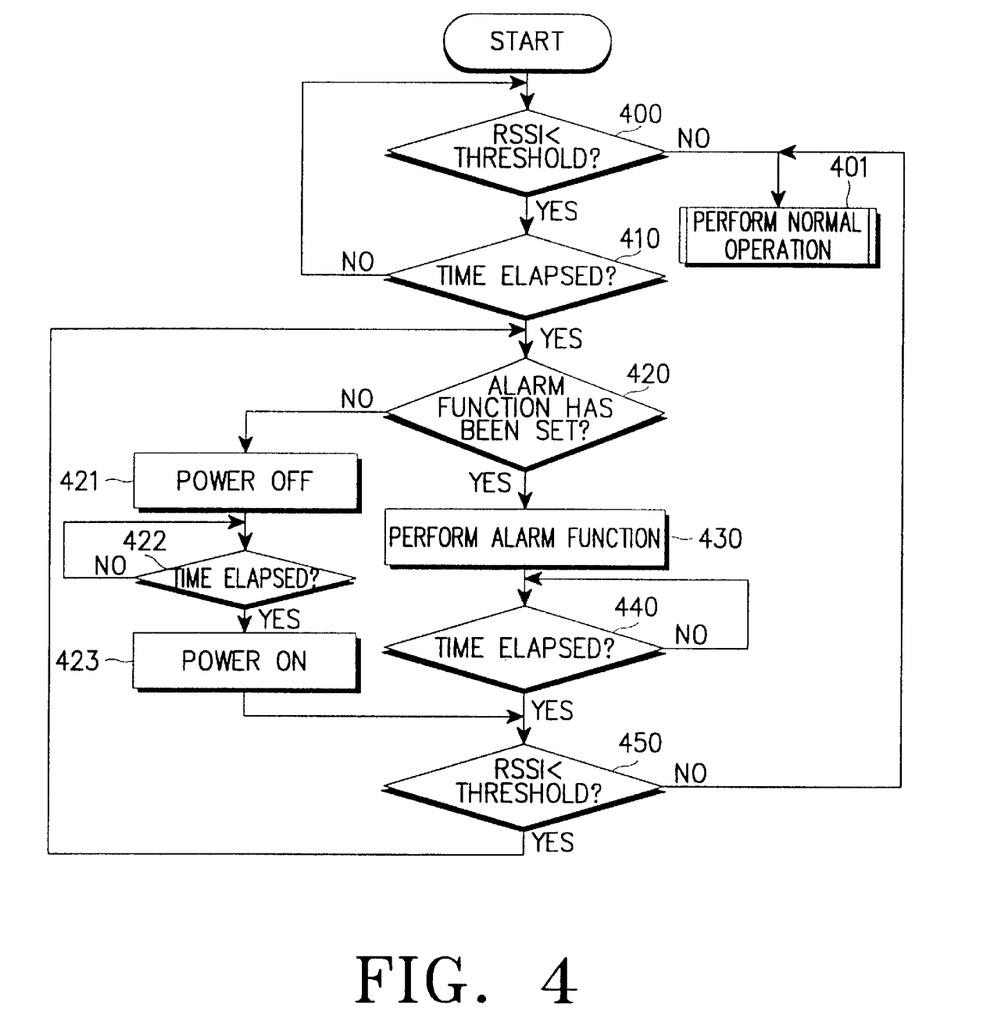
FIG. 4 is a flowchart illustrating the process of controlling the power of a radio terminal in a non-service area according to a third embodiment of the present invention.

Referring to FIG. 4, there is shown a third embodiment of the process for controlling the power of a radio terminal in a non-service area according to the present invention. Controller 100 directs the RSSI measurer 160 to measure the RSSI to see if it is less than a predetermined value at step 400. If not, a normal operation is performed at step 401. If the RSSI is less than a predetermined value, the controller 100 determines if a predetermined time period has elapsed at step 410. If a predetermined time period has not elapsed, the process proceeds to step 400 where the RSSI is again compared to a threshold value. If a predetermined time period has elapsed in a non-service area, the controller 100 determines if an alarm function has been set at step 420. If it has been set, the controller 100 performs the alarm function at step 430. The controller 100 then determines if a predetermined time period has elapsed at step 440. If so, the controller 100 determines if the RSSI is less than a predetermined value at step 450. If it is less than a predetermined value, the process returns to step 420, and if not, the process returns to step 401. If the alarm function has not been set at step 420, the power is turned off at step 421. The controller 100 then determines if a predetermined time period has elapsed at step 422. If it has elapsed, the power is turned on at step 423.

In brief, if the terminal is in a non-service area for a predetermined period of time and the alarm function has been set, the alarm function is performed. If the alarm function has not been set, the power is tuned off for a prescribed period of time to reduce power consumption. If a prescribed period of time has elapsed, the power is turned back on and the RSSI is measured again. If the RSSI is greater than a predetermined value, that is, if the terminal is in a service area, normal operation is performed.

In the first, second and third embodiments, the power is repeatedly turned off and on according to the measured RSSI. In some cases, the terminal may operate only if an identification (ID) number is entered when the power is turned on again. A user would then have to enter the ID number each time the power is turned on. The present invention turns the power off to save power and on to check whether the phone has entered a serviceable area. In the present invention, the power is turned on and the terminal enters a usable state even though a user does not enter the ID number. Therefore, according to the present invention, the normal operation of restoring power can be performed without inputting the ID number. This prevents the repeated input of the ID number during extended periods in non-service areas. However, upon sensing that there is key input or a flip is opened, the terminal displays a message requesting that an ID number should be entered.

As described above, if the terminal is in a non-service area, the power is automatically turned off or the RSSI measuring period is lengthened, thereby suppressing power dissipation.

Figure 5:
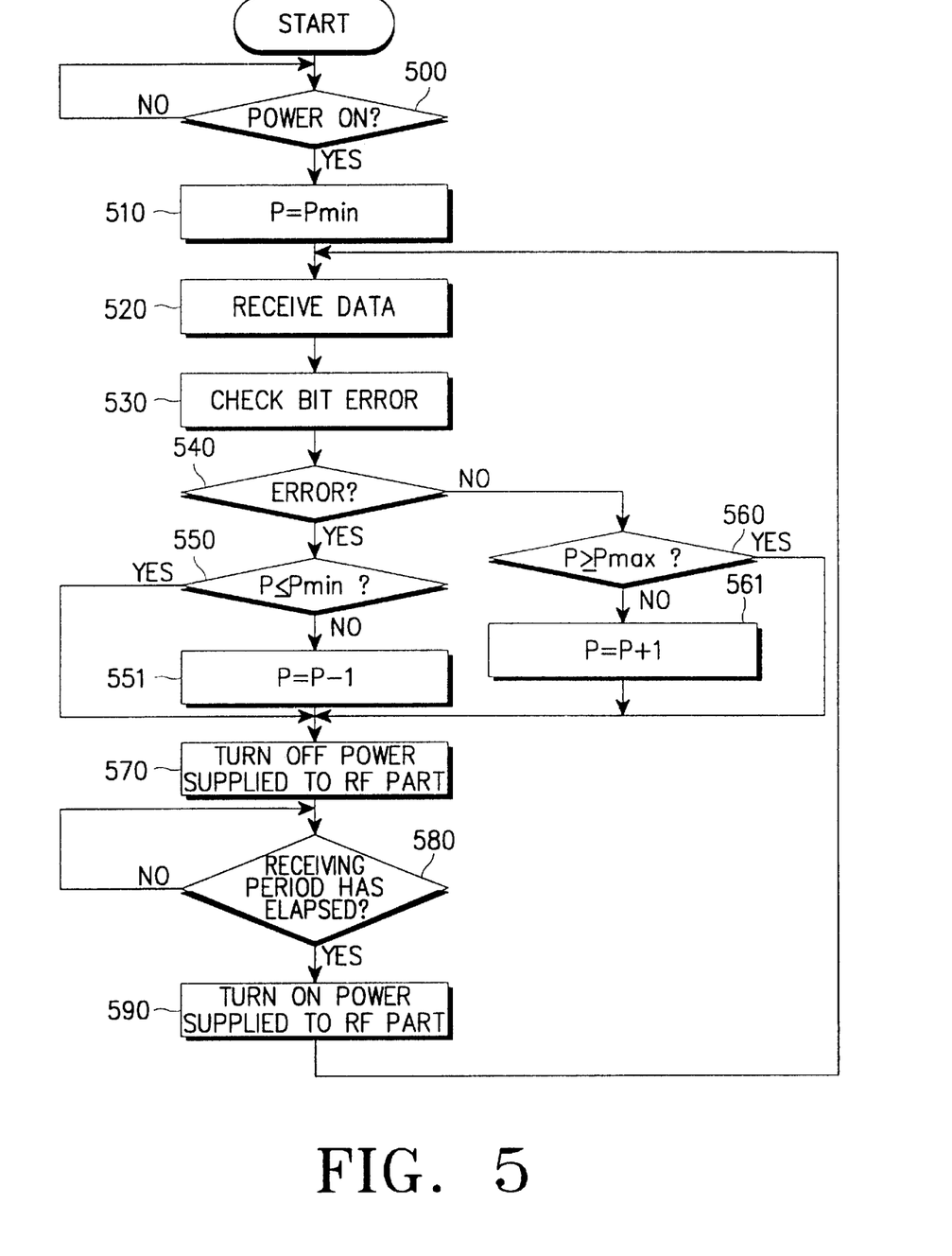
FIG. 5 is a flowchart illustrating the process of reducing the power consumption of a radio terminal according to a fourth embodiment of the present invention.

Referring to FIG. 5, there is shown a fourth embodiment of the process of controlling the power of a radio terminal according to the present invention. According to this embodiment, the power is controlled by controlling a receiving operation of a calling message, independent of whether the terminal is in a non-service area. Typically, the base station informs the terminal that there is a paging message for a few seconds. Therefore, the terminal receives the paging message within that period of time. Controller 100 determines if key data for turning on power is generated through the key entry 110 at step 500. If such key data is generated, a parameter P indicating a paging message receiving period is set to a minimum period value Pmin at step 510. The controller 100 then directs the RF part 150 to receive data at step 520. The controller 100 then directs the bit error detector 161 to check a bit error from a frame of a received calling message at step 530. In a DECT (Digital European Cordless Telephone) system, the bit error can be checked by examining the frame of a paging message received every 10 ms. The following Table 1 shows a structure of the frame.

TABLE 1

| | 64 bits | |
| --- | --- | --- |
| 8 bits | 40 bits | 16 bits |
| Header | Tail | CRC |

The header functions as an index indicating the contents of the tail bits.

The tail bits represent the contents of a message indicated by the header and typically include a telephone number or an ID of the base station. After the tail bits, the CRC (Cyclic Redundancy Check) bits are to check an error which may be generated upon receipt of a message. Therefore, whether the frame has a bit error can be checked using the CRC bits. If there is an error at step 540, the controller 100 determines if the receiving period P is less than or equal to the minimum period value Pmin at step 550. If not, the receiving period P is decreased by 1 at step 551. If no error is detected at step 540, the controller 100 determines if the receiving period P is greater than or equal to a maximum period value Pmax at step 560. If not, the receiving period P is increased by 1 at step 561. After setting the receiving period P at step 551 or 561, the controller 100 directs the power controller 170 to turn off power supplied to the RF part 150 at step 570. The controller 100 then determines if the receiving period P has elapsed at step 580. If it has elapsed, the power supplied to the RF part 150 is turned on at step 590. The process then returns to step 520.

Figure 6:
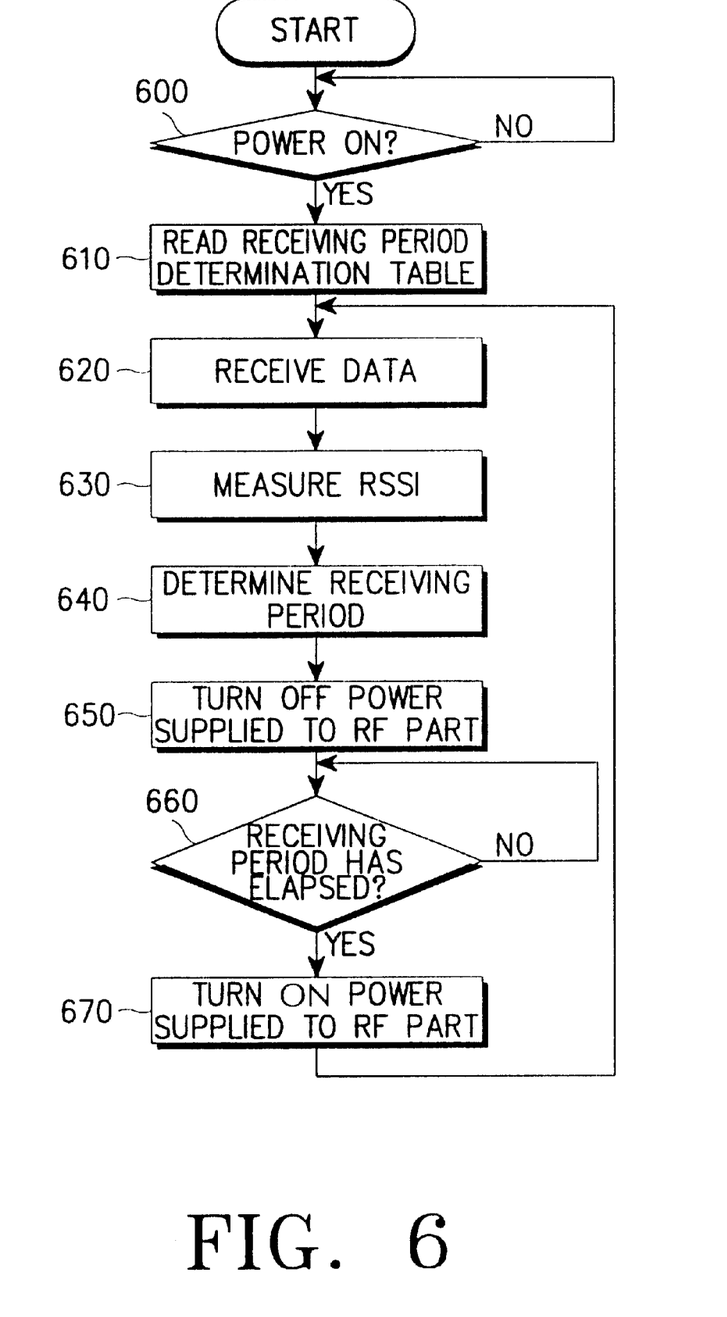
FIG. 6 is a flowchart illustrating the process of reducing the power consumption of a radio terminal according to a fifth embodiment of the present invention.

Referring to FIG. 6, there is shown a fifth embodiment of the process of controlling the power of a radio terminal in accordance with the present invention. In this embodiment, the receiving period is controlled according to the RSSI. Controller 100 determines if the power is turned on at step 600. If yes, the controller 100 reads a receiving period determination table from the memory 130 at step 610. The receiving period determination table is to determine the receiving period according to the RSSI and is listed below in Table 2 by way of example.

TABLE 2

| RSSI | Receiving Period P |
| --- | --- |
| 10 | 1 second |
| 9 | 800 ms (milliseconds) |
| 8 | 700 ms |
| 7 | 500 ms |
| 6 | 300 ms |
| 5 | 100 ms |
| 4 | 40 ms |
| 3 | 10 ms |

The controller 100 directs the RF part 150 to receive data at step 620 and directs the RSSI measurer 160 to measure the RSSI at step 630. The controller 100 then determines the receiving period at step 640 and directs the power controller 170 to turn off the power supplied to the RF part 150 at step 650. The controller 100 checks if the receiving period has elapsed at step 660. If the receiving period has elapsed, the power supplied to the RF part 150 and it is turned on at step 670. The process then returns to step 620.

In brief, the RSSI is measured and the receiving period is determined according to the measured RSSI. The stronger the RSSI, the longer the receiving period. Therefore, assuming the RSSI increases the closer the phone is to a base station, the power supplied to the RF part 150 is turned off during the receiving period to reduce power consumption in an idle mode of the terminal. Phone terminals closest to the base station and having the strongest RSSI may reduce power consumption by lengthening the receiving period used to recheck the RSSI.

Figure 7:
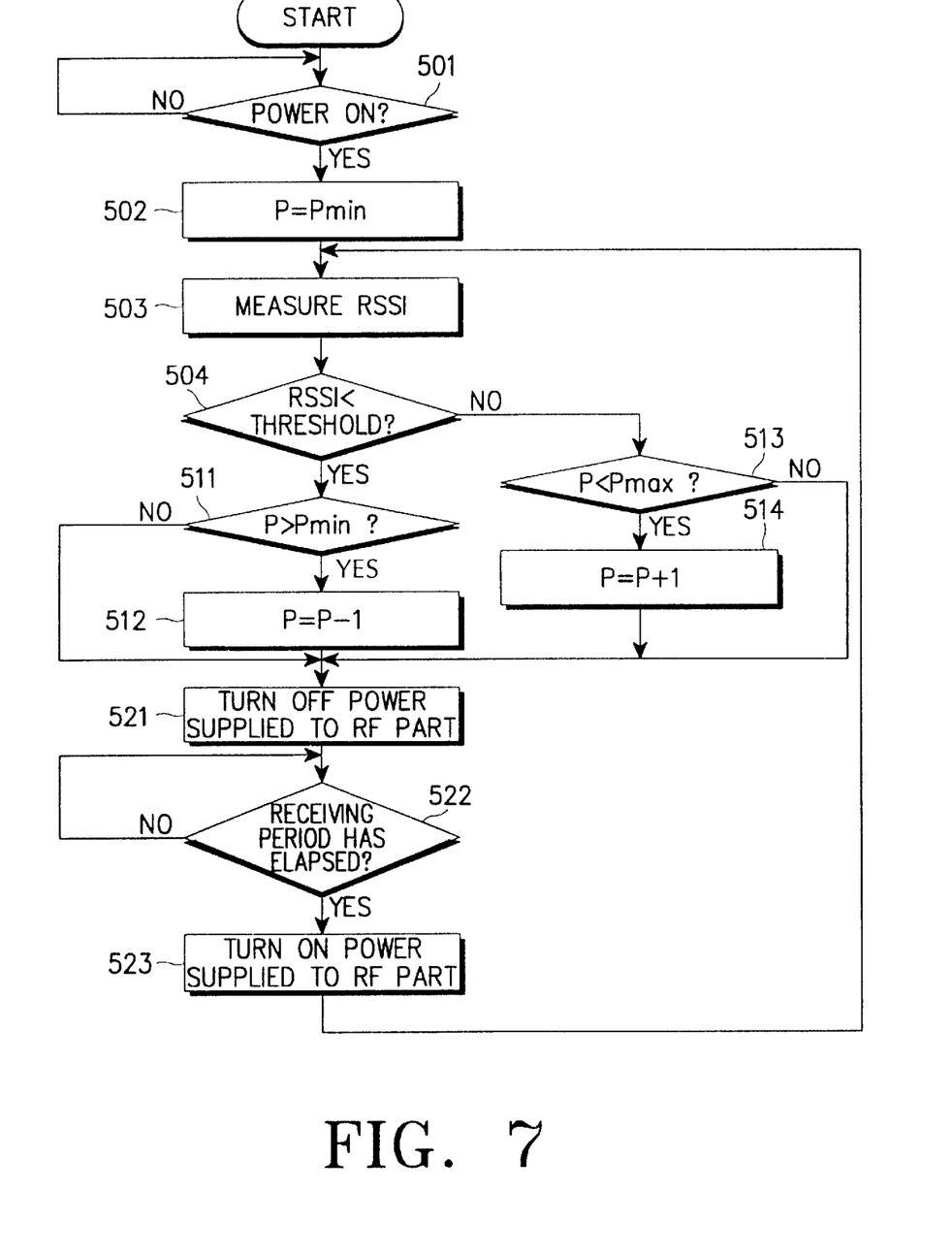
FIG. 7 is a flowchart illustrating the process of reducing the power consumption of a radio terminal according to a sixth embodiment of the present invention.

While the fourth embodiment of FIG. 5 controlled the receiving period by checking the bit error, the sixth embodiment of FIG. 7 controls the receiving period by measuring the RSSI. In the fourth and sixth embodiments, the bit error or RSSI is checked and is used to increase or decrease the receiving period. During the receiving period power is not supplied to the RF part 150 thereby reducing power consumption.

Referring to FIG. 7, there is shown a sixth embodiment of the process of controlling the power of a radio terminal according to the present invention. Controller 100 determines if the power is turned on at step 501. If so, the receiving period P is set to the minimum period value Pmin at step 502. The controller 100 then directs the RSSI measurer 160 to measure the RSSI at step 503. If the RSSI is less than a predetermined value at step 504, the controller 100 determines if the receiving period P is greater than the minimum period value Pmin at step 511. If so, the receiving period P is decreased by 1 at step 512. If the RSSI is not less than a predetermined value at step 504, the controller 100 determines if the receiving period P is less than the maximum period value Pmax at step 513. If yes, the receiving period P is increased by 1 at step 514. After setting the receiving period P at step 512 or 514, the controller 100 directs the power controller 170 to turn off the power supplied to the RF part 150 at step 521. If either P=Pmin or P=Pmax, then the value of P is not changed. The controller 100 then determines if the receiving period P has elapsed at step 522. If it has elapsed, the power supplied to the RF part 150 is turned on at step 523. The process then returns to step 503.

In the sixth embodiment of FIG. 7, if the currently received RSSI is less than a predetermined value, the receiving period is set to the minimum period value, and if it is greater than a predetermined value, the receiving period is set to the maximum period value. Similarly, in the fourth embodiment of FIG. 5, if the bit error occurs, the receiving period is set to the minimum period value, and if not, the receiving period is set to the maximum period value. In the fifth embodiment of FIG. 6, the receiving period is set in proportion to the RSSI.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for reducing the power consumption of a radio terminal, comprising the steps of:

reading a preset receiving period determination table if power supplied to the radio terminal is turned on, said receiving period determination table containing RSSI level information and corresponding receiving periods such that increasing RSSI levels correspond to increasing receiving periods;

measuring an RSSI level and setting a receiving period from the period determination table in proportion to the measured RSSI level;

turning off power supplied to at least one component of the terminal during the set receiving period;

turning on the power supplied to the at least one component of the terminal if the receiving period has elapsed; and returning to the step of measuring an RSSI level.

2. A method for reducing the power consumption of a radio terminal, comprising the steps of:

setting a receiving period to a minimum period value if power supplied to the radio terminal is turned on;

measuring an RSSI level to determine whether the RSSI level is less than a predetermined value;

determining whether the receiving period is greater than the minimum period value if the RSSI level is less than the predetermined value;

decreasing the receiving period if the receiving period is greater than the minimum period value;

determining whether the receiving period is less than a maximum period value if the RSSI level is not less than the predetermined value;

increasing the receiving period if the receiving period is less than the maximum period value;

turning off power supplied to at least one component of the terminal during the set receiving period if the receiving period is less than or equal to the minimum period value or if it is greater than or equal to the maximum period value;

turning on the power supplied to the receiving side if the receiving period has elapsed; and returning to the step of measuring an RSSI level.

3. A method for reducing the power consumption of a radio terminal, comprising the steps of:

setting a receiving period to a minimum period value if power supplied to the radio terminal is turned on;

receiving data and determining whether a bit error occurs;

determining whether the receiving period is less than or equal to the minimum period value if the bit error occurs;

decreasing the receiving period if the receiving period is greater than the minimum period value;

determining whether the receiving period is greater than or equal to a maximum period value if no bit error is detected;

increasing the receiving period if the receiving period is less than the maximum period value;

turning off power supplied to at least one component of the terminal during the set receiving period if the receiving period is less than or equal to the minimum period value or if it is greater than or equal to the maximum period value;

turning on the power supplied the to the at least one component of the terminal if the receiving period has elapsed; and returning to the step of receiving data.

4. A method for controlling power consumption in a radio terminal, comprising the steps of:

(a) measuring received signal strength indicator (RSSI) level;

(b) determining whether the RSSI level is less than a predetermined value, and if not returning to step (a);

(c) checking whether a measuring time interval has elapsed;

(d) determining if the measuring time interval is greater than a threshold value;

(e) if the measuring time interval is less than the threshold value, increasing the measuring time interval, and if the measuring time interval has elapsed, returning to step (a);

(f) if the measuring time interval is greater than the threshold value, turning off power supplied to at least one component of the radio terminal; and (g) if the measuring time interval has elapsed, turning on power supplied to the at least one component of the radio terminal, and returning to step (a).

5. A method for reducing power consumption of a radio terminal, comprising the steps of:

setting a receiving period to a minimum period value if power supplied to the radio terminal is turned on;

receiving data and determining whether a bit error occurs;

determining whether the receiving period is less than or equal to the minimum period value if the bit error occurs;

decreasing the receiving period if the receiving period is greater than the minimum period value;

determining whether the receiving period is greater than or equal to a maximum period value if no bit error is detected;

increasing the receiving period if the receiving period is less than the maximum period value;

turning off power supplied to at least one component of the terminal during the set receiving period;

turning on the power supplied to the at least one component of the terminal if the receiving period has elapsed; and returning to the step of receiving data.

6. A method for reducing the power consumption of a radio terminal, comprising the steps of:

setting a receiving period to a minimum period value if power supplied to the radio terminal is turned on;

measuring an RSSI level to determine whether the RSSI level is less than a predetermined value;

determining whether the receiving period is greater than the minimum period value if the RSSI level is less than the predetermined value;

decreasing the receiving period if the receiving period is greater than the minimum period value;

determining whether the receiving period is less than a maximum period value if the RSSI level is not less than the predetermined value;

increasing the receiving period if the receiving period is less than the maximum period value;

turning off power supplied to at least one component of the terminal during the set receiving period;

turning on the power supplied to the receiving side if the receiving period has elapsed; and returning to the step of measuring an RSSI level.

* * * * *